(12) United States Patent  (10) Patent No.: US 12,465,925 B2
Convery  (45) Date of Patent: Nov. 11, 2025

(54) METHOD AND APPARATUS FOR WASHING AND GRADING SAND

(71) Applicant: CDE Global Limited, Cookstown (GB)

(72) Inventor: Anthony Convery, Moneymore (GB)

(73) Assignee: CDE Global Limited, Cookstown (GB)

( * ) Notice: Subject to any disclaimer, the term of this patent is extended or adjusted under 35 U.S.C. 154(b) by 0 days.

(21) Appl. No.: 18/920,976

(22) Filed: Oct. 20, 2024

(65) Prior Publication Data

US 2025/0128267 A1 Apr. 24, 2025

(30) Foreign Application Priority Data

Oct. 19, 2023 (GB) ...................................... 2315975

(51) Int. Cl.
*B03B 5/34* (2006.01)
*B03B 7/00* (2006.01)
*B03B 9/00* (2006.01)

(52) U.S. Cl.
CPC .................. *B03B 7/00* (2013.01); *B03B 5/34* (2013.01); *B03B 9/00* (2013.01)

(58) Field of Classification Search
CPC .. B03B 5/34; B03B 5/48; B03B 5/623; B03B 7/00; B03B 9/02; B07B 2230/01
See application file for complete search history.

(56) References Cited

U.S. PATENT DOCUMENTS 1,319,208 A * 10/1919 Cole ...................... B03D 1/245
 209/159
1,410,340 A 3/1922 Merwin
4,282,088 A * 8/1981 Ennis ........................ B03B 5/36
 209/172.5
5,049,261 A 9/1991 Tapp et al.
6,264,040 B1 * 7/2001 Mankosa ................ B03B 11/00
 209/172.5

(Continued)

FOREIGN PATENT DOCUMENTS

WO 2010088090 8/2010
WO 2011077183 6/2011
WO 2014106302 7/2014

OTHER PUBLICATIONS

Webpage screenshot of "CEMCO Build First Portable Frac Sand Plant" Article from <https://cemcoturbo.com/news_frac.html>, Published Jun. 11, 2012 in Rocks Products Magazine.

*Primary Examiner* — Joseph C Rodriguez
(74) *Attorney, Agent, or Firm* — Gardner, Linn, Burkhart & Ondersma LLP (57) ABSTRACT

A method of washing and grading sand includes passing sand entrained in water to a first fines separation stage having one or more hydrocyclones, passing sand from the hydrocyclone(s) into a second fines separation stage including a tank with spray bars arranged in a lower region to create an upwardly-directed flow of water in the tank. Excess water and any fine material, such as clay, is washed out of the sand passing over the weir. Sand passing out of a sand outlet of the tank in or adjacent the lower region of the tank passes onto the deck of a dewatering screen, whereupon the sand is graded and dewatered. Oversize material passes over a downstream end of the deck of the dewatering screen as a sand product, while undersize material and water passing through the deck is collected in a sump of the dewatering screen.

13 Claims, 6 Drawing Sheets

(56) References Cited

U.S. PATENT DOCUMENTS

| | | |
|---|---|---|
| 7,461,746 B1 | 12/2008 | Egge et al. |
| 8,317,904 B2 | 11/2012 | Sarshar et al. |
| 8,636,149 B2 | 1/2014 | Craig |
| 9,409,184 B1 | 8/2016 | Mickelson et al. |
| 9,744,537 B2 | 8/2017 | Convery et al. |
| 10,799,880 B2 | 10/2020 | McKeown |
| 12,115,536 B2 * | 10/2024 | Hamzeh ................ B03B 5/66 |
| 2003/0234227 A1 * | 12/2003 | Niitti ................ B01D 21/0033 210/519 |
| 2004/0026342 A1 | 2/2004 | O'Brien et al. |
| 2004/0112822 A1 | 6/2004 | Saik |
| 2005/0045535 A1 * | 3/2005 | Fendley ................ B01D 21/34 210/522 |
| 2010/0071902 A1 | 3/2010 | Ziegler |
| 2015/0135636 A1 | 5/2015 | Ayres |
| 2016/0263583 A1 | 9/2016 | Moran |
| 2019/0270090 A1 * | 9/2019 | Coulton ................ B03B 5/623 |

\* cited by examiner

METHOD AND APPARATUS FOR WASHING AND GRADING SAND

CROSS REFERENCE TO RELATED APPLICATION

The present application claims priority benefit of U.K. Pat. Application Ser. No. 2315975.9 filed Oct. 19, 2023, which is hereby incorporated herein by reference in its entirety.

FIELD

The present application relates to a method and apparatus for washing and grading sand, and in particular to a method and apparatus for washing and grading sand for use in the manufacture of concrete.

BACKGROUND

Aggregate is a broad category of coarse particulate material used in construction, such term encompassing sand, gravel and crushed stone. The term "sand" typically covers aggregate having a grain size of between 0.075 mm and 4.75 mm while the term "gravel" typically covers aggregate having a grain size of between 4.75 mm and 76.2 mm. Aggregates, in particular sands, are typically washed and graded on a combination of vibrating screens, to grade and dewater material, and hydrocyclones, to remove fine contaminants, to produce washed aggregate products having a predetermined grain size or range of grain size.

A typical vibrating screen includes a frame, defined by a pair of substantially parallel side walls interconnected by transversely extending bridging members, upon which is mounted a polyurethane deck having small openings or slots for water and undersize particles to pass through. The frame is typically mounted on a base via resilient linkages and the frame, and thus the deck, is typically vibrated by means of a pair of counter rotating rotors defining eccentric masses, driven by one or more drive motors, to impart circular or reciprocating vibrating motion to the deck. Such screens can be used for washing and grading and/or dewatering aggregate, oversize material passing over the deck of the screen to be collected from a downstream end of the screen while water and undersize material is collected in a sump of the screen for subsequent processing.

A hydrocyclone is a device used to separate particles in a liquid suspension based on the ratio of their centripetal force to fluid resistance, facilitating the separation and removal of fine contamination from aggregates, sand in particular. A hydrocyclone typically includes a cylindrical section having an inlet for supplying a feed slurry into the hydrocyclone tangentially, and a conical base. Outlets are provided at upper and lower ends of the hydrocyclone. Underflow, containing the coarser fraction (typically a sand product), passes out of the lower outlet while overflow, containing the finer fraction (typically fine contaminants, such as clay and silt) and most of the water, passes out of the outlet at the upper end of the hydrocyclone.

A coarser specification of sand is required to manufacture concrete in the US market when compared to that normally required for the European market. The American Society for Testing and Materials (ASTM) specifies a specific grade of sand for use in concrete products. This specification is referred to as C33. This sand is typically in the grain size range of 2 mm to 8 mm. In the US, sand having a grain size less than 2 mm is typically used as masonry sand rather than for concrete production. Such grade of sand can be problematic for known sand washing and grading systems due to excessive wear caused by the courser sand, in particular in hydrocyclones, leading to problems reliably removing fine contamination, such as clay, from the sand. Furthermore, sand is often contaminated with substantial amounts of free silts/clays (these are silts/clays that are not binded or adhered in clumps or to other particles present within the material). Often the feed material contains large quantities of clayballs and/or other friable particles. These particles than are larger than that able to be removed in a hydrocyclone (comparable in size to the sand particles). Therefore, these particles move with the sand and come out with the final product.

SUMMARY

The present application is directed to a sand washing and grading method and apparatus that deals more effectively with the presence of silts/clays in the feed material. According to a first aspect there is provided a method of washing and grading sand including the steps of passing sand entrained in water to a first fines separation stage including one or more hydrocyclones, passing sand in the underflow from the one or more hydrocyclones into a second fines separation stage including a tank having a plurality of spray bars arranged in a lower region of the tank coupled to a water supply such that an upwardly directed flow of water is created in the tank, the tank including a weir, excess water and any fine material, such as clay, washed out of the sand passing over the weir, sand passing out of a sand outlet of the tank in or adjacent the lower region of the tank to pass onto the deck of a dewatering screen, whereupon the sand is graded and dewatered, oversize material passing over a downstream end of the deck of the dewatering screen as a sand product while undersize material and water passing through the deck is collected in a sump of the dewatering screen.

Optionally, the excess water passing over the weir of the tank passes into the sump of the dewatering screen.

The sand outlet may be provided with an adjustable flow control device, the method including adjusting the adjustable flow control device to control the flow rate of sand and water onto the deck of the dewatering screen.

The water level in the tank may be adjusted by adjusting the height of the weir.

According to a further aspect there is provided an apparatus for washing and grading sand including a first fines separation stage including one or more hydrocyclones, wherein the underflow from the one or more hydrocyclones passes to a second fines separation stage including a tank having a plurality of spray bars arranged in a lower region of the tank, the spray bars being coupled to a water supply to create an upwardly directed flow of water within the tank, the tank including a weir over which excess water and any fine material, such as clay, washed out of the sand passes, a sand outlet being provided in or adjacent the lower region of the tank adapted to pass sand onto the deck of a dewatering screen, whereupon the sand is graded and dewatered, wherein oversize material passes over a downstream end of the deck of the dewatering screen as a sand product while undersize material and water passes through the deck to be collected in a sump of the dewatering screen.

The excess water passing over the weir of the tank may be passed into the sump of the dewatering screen.

The sand outlet may be provided with an adjustable flow control device adapted to be adjusted to control the flow rate of sand and water onto the deck of the dewatering screen. The height of the weir may be adjustable to adjust the water level in the tank.

In one embodiment the underflow from the one or more hydrocyclones of the first fines separation stage may be delivered into a first section of the tank, the sand outlet being provided in a second section of the tank, a baffle plate extending transversely across a width of the tank between the first and second sections of the tank, a lower edge of the baffle plate being spaced from a lower wall of the tank such that sand passes under the baffle plate to pass between the first and second sections of the tank, the sand outlet being provided in a lower region of the second section of the tank for delivering sand from the tank onto the deck of the dewatering screen. Water and fine material may pass over an upper edge of the baffle plate to pass from the first section to the second section of the tank. The baffle plate may be spaced from and may extend parallel to the weir. An upper edge of the baffle plate may be arranged higher than an upper edge of the weir to facilitate the flow of sand beneath the baffle plate by creating a height differential in the level of water in the first and second sections of the tank. The tank may include a third region, the weir separating the third region of the tank from the second region of the tank, a water outlet being provided in a lower region of the third section, wherein water passing through the water outlet passes into the sump of the dewatering screen. The water outlet may feed into a feed box located in an opening in the deck of the dewatering screen to allow water to pass through the deck and into the sump of the dewatering screen.

These and other objects, advantages, purposes and features of the present invention will become apparent upon review of the following specification in conjunction with the drawings.

DETAILED DESCRIPTION OF THE DRAWINGS

An apparatus for washing and grading sand, which may be particularly well suited to the production of C33 grade sand, is illustrated in FIGS. 1 to 8.

Figure 1:
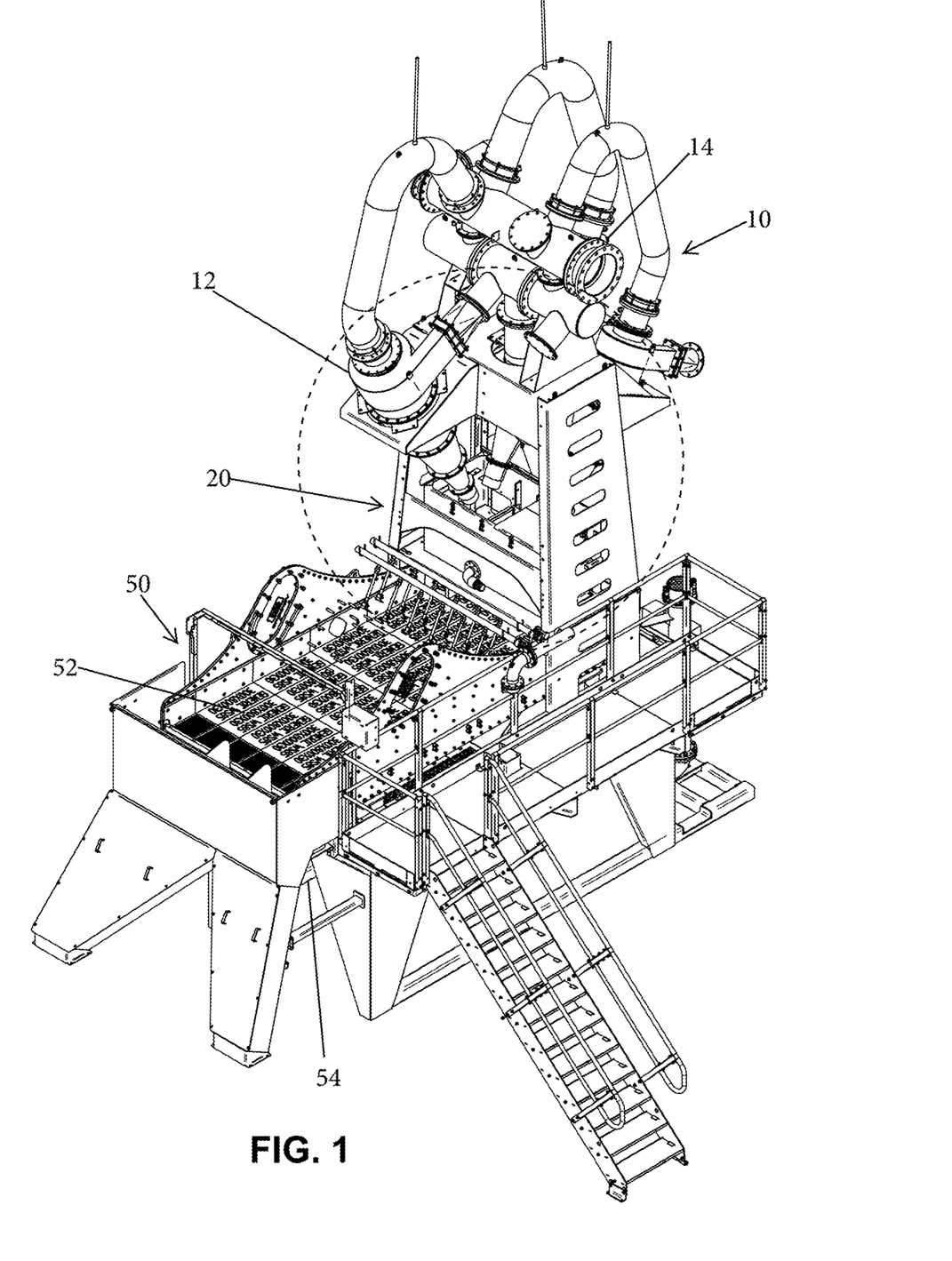
FIG. 1 is a schematic illustration of an apparatus for washing and grading sand in accordance with an embodiment.
Figure 2:
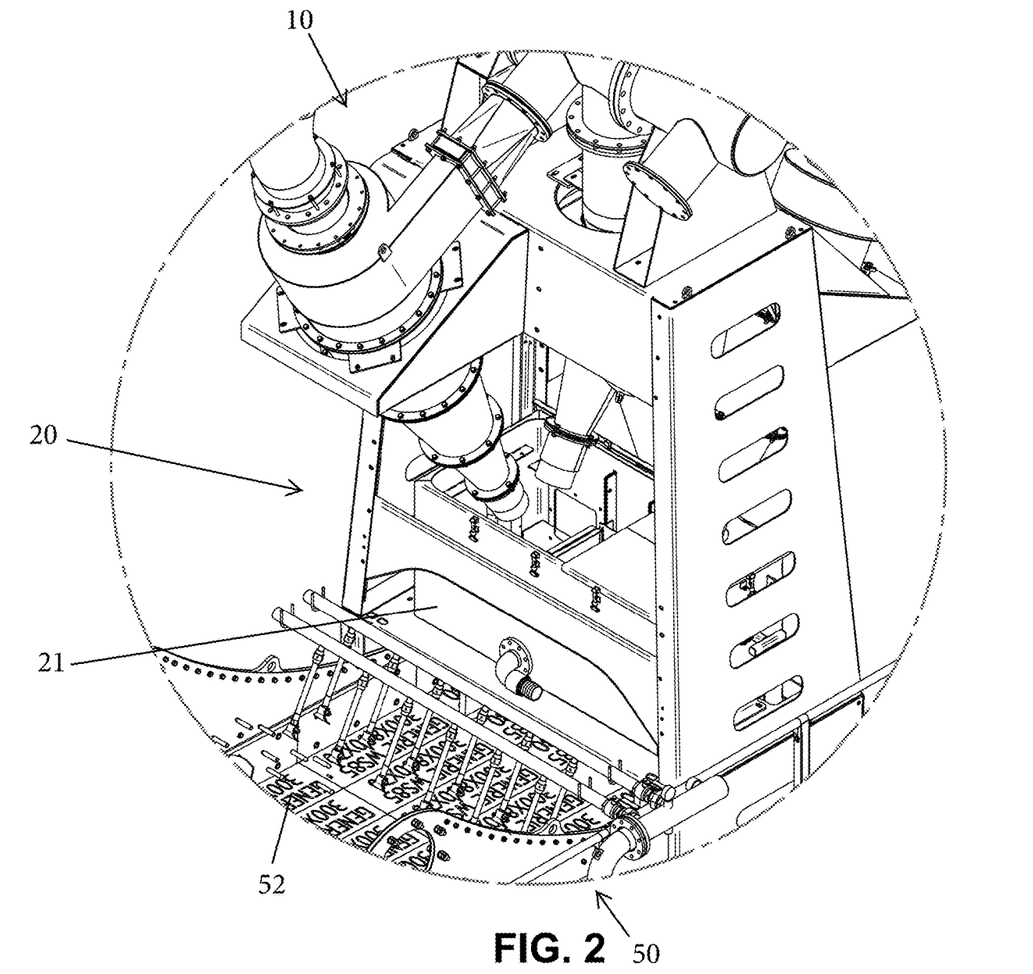
FIG. 2 is a detailed view of the second fines separation stage of the sand washing and grading system of FIG. 1.

A feed material comprising sand to be washed and graded is delivered to a first fines separation stage 10, including a plurality of hydrocyclones 12,14 arranged in parallel. The underflow from the hydrocyclones 12,14 of the first fines separation stage, comprising a mixture of partially washed sand and water, is passed into a second fines separation stage 20 to remove further fine contaminants, such as clay, from the sand, before being passed onto a dewatering screen 50 for grading and dewatering.

The second fines separation stage 20 comprising a rectangular tank 21 within a lower region of which is mounted a plurality of water spray bars 22 having outlet apertures adapted to create an upwardly directed flow of water in the tank when the water spray bars 22 are coupled to a supply of water. Further outlet apertures are provided in the water spray bars 22 to provide a horizontally directed flow of water from an inlet region of the tank 21 towards an outlet region. As shown in the drawings, the water spray bars 22 extend from a water supply manifold 24, each water supply pipe 22 having a first portion 22A extending along a bottom wall of the tank 21 having apertures 23A therein to provide the upwardly directed flow of water in the tank 21 and a second portion 22B extending vertically along a side wall of the tank adjacent the inlet region having apertures 23B therein to provide the horizontally directed flow of water.

The tank is divided into three sections including an inlet section 25, a sand collection section 26 and a water collection section 27. The underflow from the hydrocyclones 12,14 of the first fines separation stage 10 is arranged to pass into the inlet section 25 of the tank 21 of the second fines separation stage 20. A transversely extending baffle plate 28 separates the sand collection section 26 from the inlet section 25 of the tank 21. A lower edge of the baffle plate 28 is spaced above the bottom wall of the tank 21 so that sand can pass beneath the baffle plate 28 from the inlet section to the sand collection section 26 to reach a sand outlet 29 in a lower region of the sand collection section 26 of the tank.

The location of the baffle plate close to the water spray bars ensures that the sand entering the tank 21 remains close to the outlets 23A,23B of the water spray bars 22. This induces attrition of the sand and aids in the breaking down of any clayball/friable particles present. Once the clayballs/friables have been broken down they are then floated off with the upward rising current inside the feed box and washed from the system. The location of the baffle plate also helps to prevent the formation of a sand bed on top of the spray bars 22.

The side of the baffle plate facing the inlet section 25 of the tank 21 may be provided with replaceable wear plates thereon.

Excess water and separated fine contaminants flows over the top of the baffle plate 28 to pass from the inlet section 25 into the sand collection section 26. The water collection section 27 is separate from the sand collection section 26 by a transversely extending weir 30 over which excess water and separated fine contaminants pass to reach a water outlet 31 in a lower region of the water collection section 27 of the tank 21. An upper edge of the baffle plate 28 may be arranged higher than an upper edge of the weir 30 to maintain a higher water level in the inlet section 25 that the sand collection section 26 to encourage sand to flow beneath the baffle plate 28 and into the sand collection section 26.

The sand outlet 29 of the sand collection section 26 of the tank 21 is arranged to deliver sand onto a deck 52 of the dewatering screen 50 located directly below the tank 21 while the water outlet 31 of the water collection section 27 of the tank 21 is arranged to deliver water and removed fine contaminants into a sump 54 of the dewatering screen 50. The water outlet 31 may be located over a feed box (not shown) mounted in an opening the deck 52 of the dewatering screen 50 to pass water through the deck 52 and into the sump 54 of the dewatering screen 50.

Figure 3:
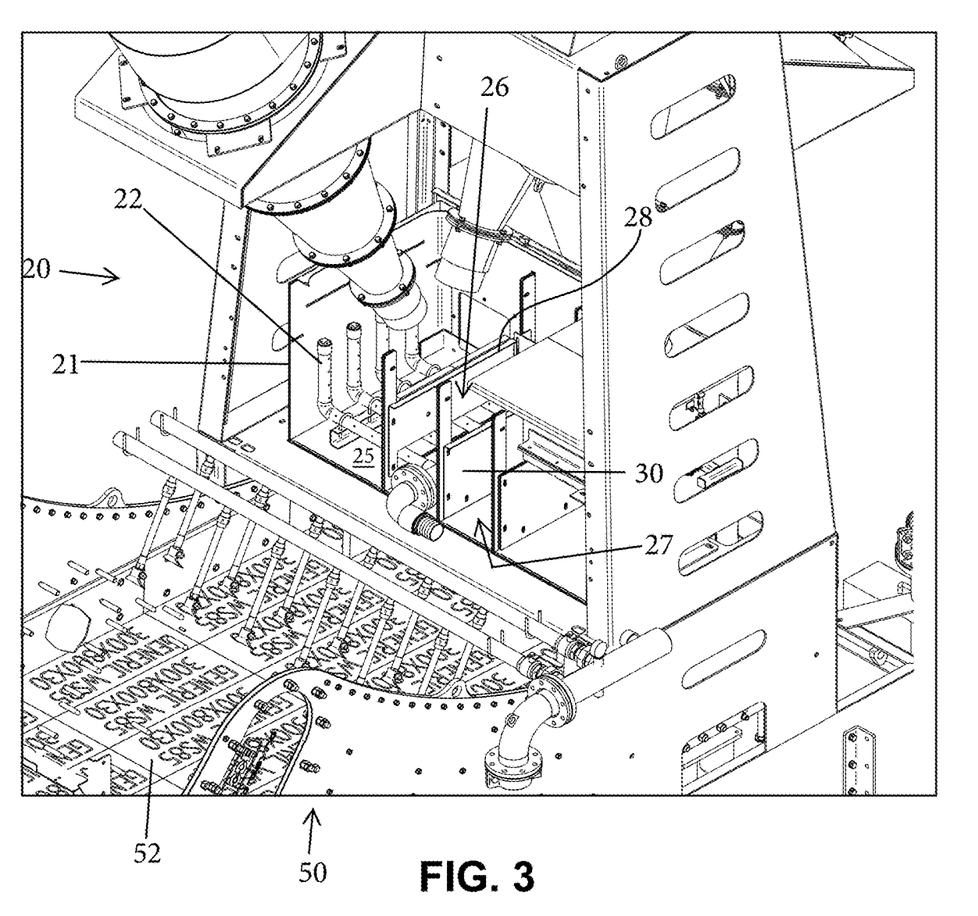
FIG. 3 is a detailed part sectional view of the second fines separation stage of the sand washing and grading system of FIG. 1.
Figure 4:
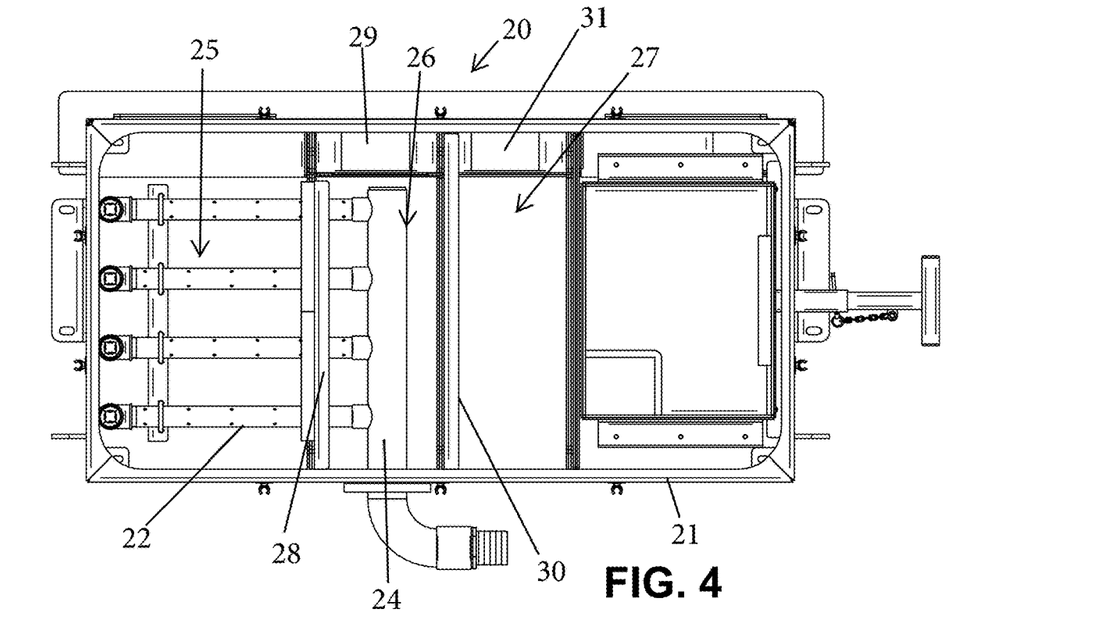
FIG. 4 is a plan view of the second fines separation stage of the sand washing and grading system of FIG. 1 in isolation.
Figure 5:
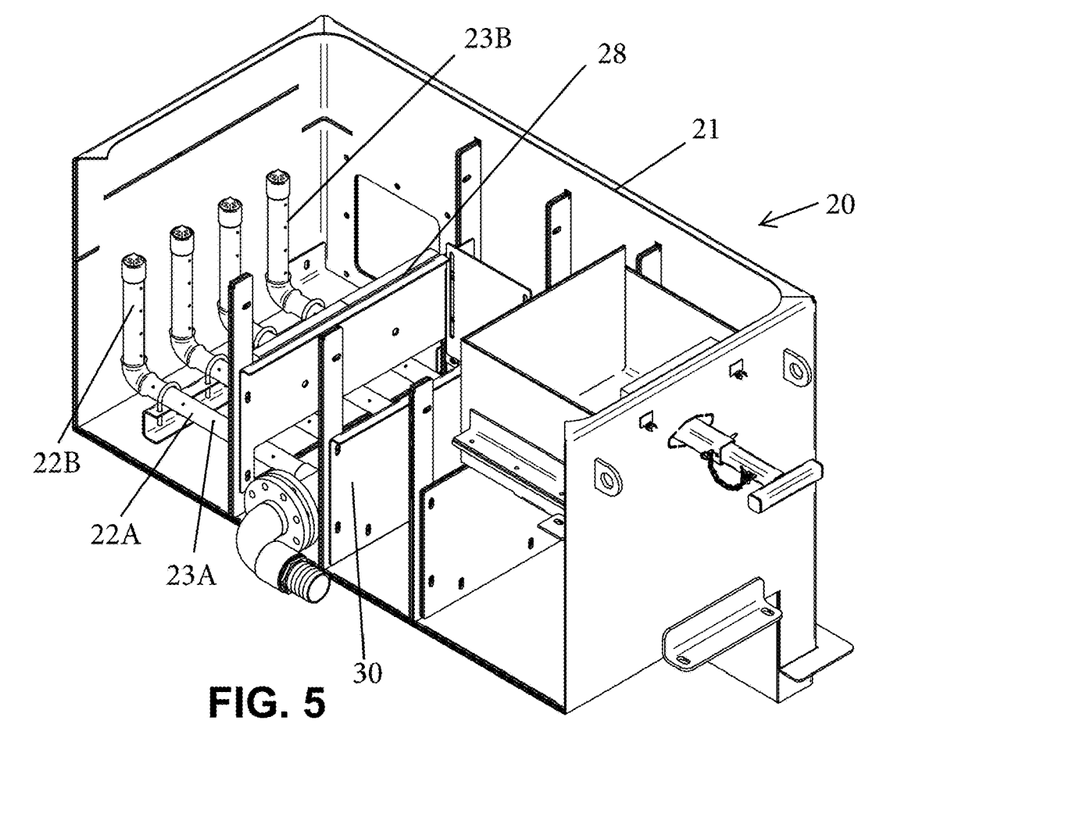
FIG. 5 is a sectional perspective view of the second fines separation stage of the sand washing and grading system of FIG. 1.
Figure 6:
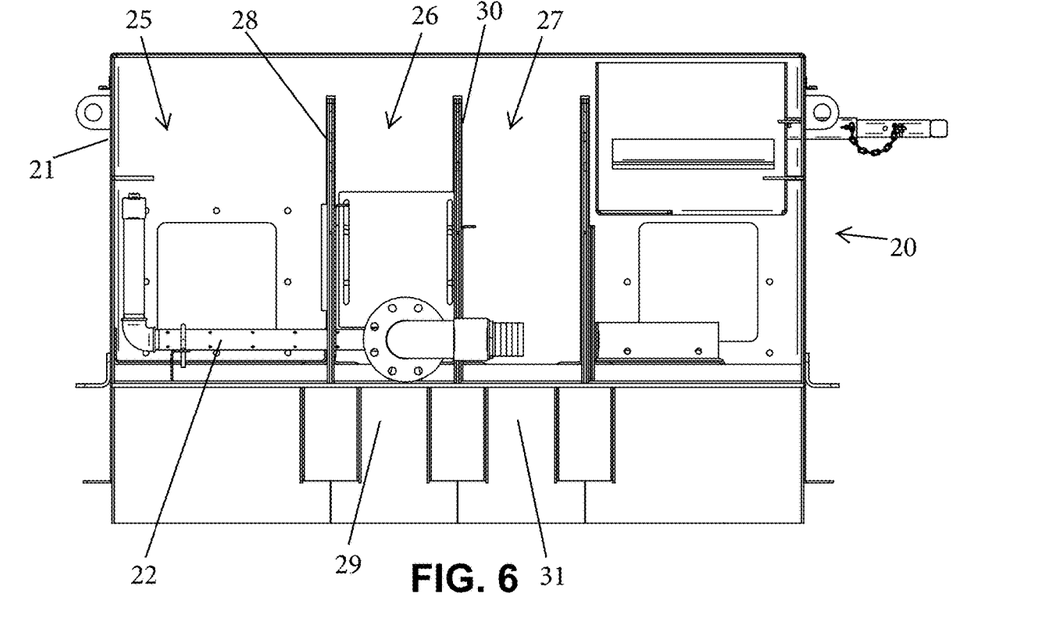
FIG. 6 is a sectional side view of the second fines separation stage of the sand washing and grading system of FIG. 1.
Figure 7:
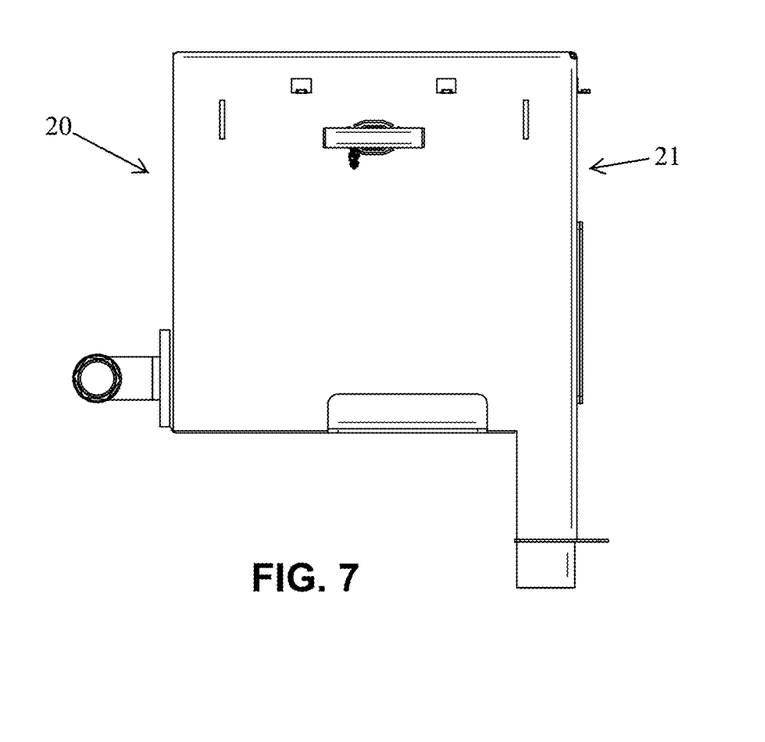
FIG. 7 is an end view of the second fines separation stage of the sand washing and grading system of FIG. 1.
Figure 8:
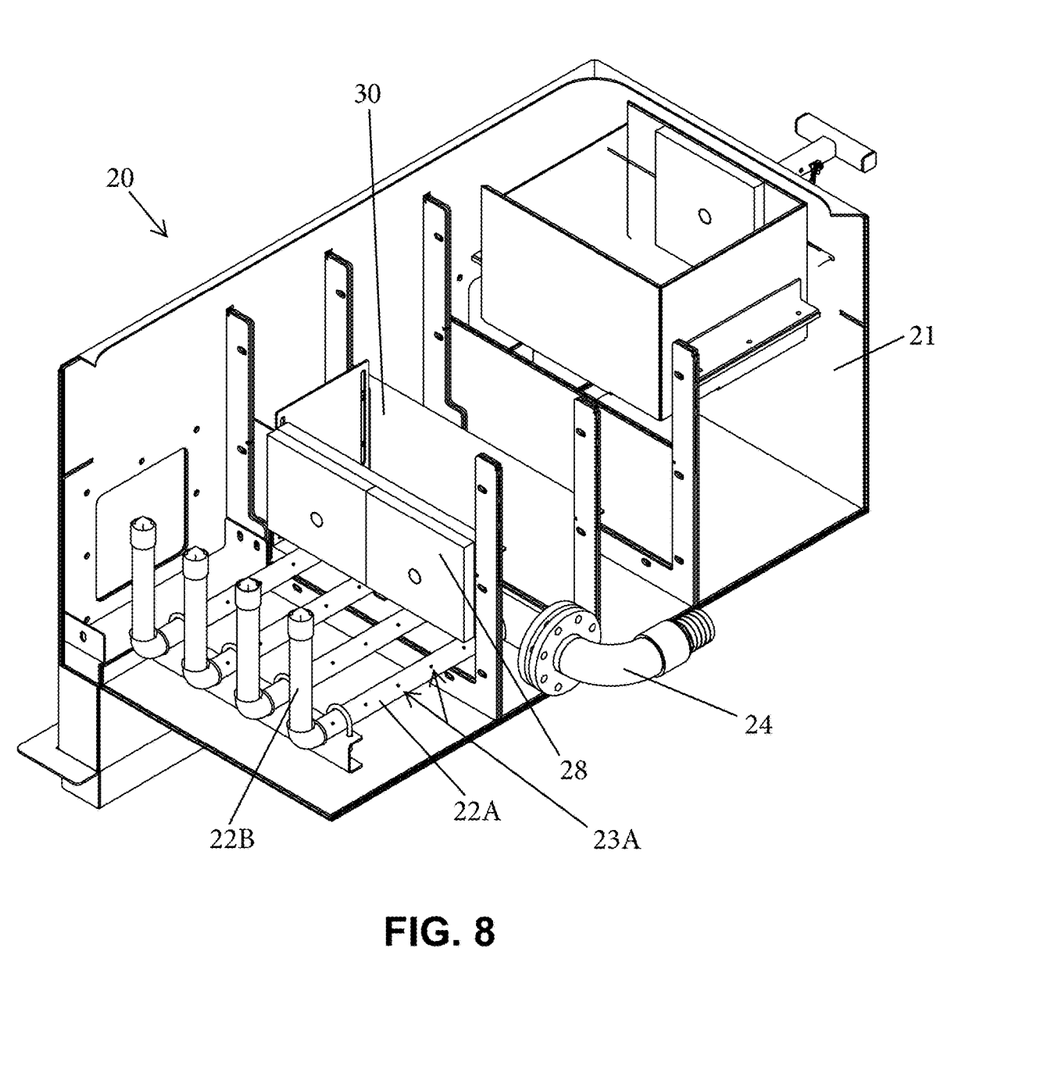
FIG. 8 is a sectional perspective view of the second fines separation stage of the sand washing and grading system of FIG. 1.

As best illustrated in FIG. 3, an underflow from the hydrocyclones 12,14 of the first fines separation stage 10 is fed into the inlet section 25 of the tank 21 of the second fines separation stage 20, above the water spray bars 22.

The relatively heavy sand sinks to the bottom of the tank 21 while fine material washed from the sand, such as clay, tends to be entrained in the upwardly in the flow of water in the tank 21. The washed sand passed under the baffle plate 28 to pass from the inlet section 25 into the sand collection section 26 of the tank 21 and exits the sand outlet 29 of the tank to be delivered onto the deck 52 of the dewatering screen 50 directly below the tank. Excess water and fine contaminants, such as clay, washed out of the sand passes over the baffle plate 28 into the sand collection section 26 of the tank 21 and then over the weir 30 into the water collection section 27 of the tank 21 before passing through the water outlet 31 of the tank 21 and into the sump 54 of the dewatering screen 50.

A sand product, for example having a particle size of between 0.8 mm and 8 mm, is delivered from the downstream end of the dewatering screen.

A flow control device (not shown) may be associated with the sand outlet 29 to control the flow rate of sand and water passing onto the deck 52 of the dewatering screen 50 from the tank 21 to suit the operating parameters of the dewatering screen. The height of the weir 30 within the tank 21 may be adjustable to control the water level within the tank 21.

Water and fine material passing through the apertures in the deck 52 of the dewatering screen 50 and into the sump 54 may be pumped through a further hydrocyclone. An underflow from the further hydrocyclone may be passed onto the deck of the dewatering screen.

Water and fine contamination overflowing from the upper ends of the hydrocyclones 12,14 of the first fines separation stage 10 and from any further hydrocyclones may be passed to a water treatment system, which may include a settling tank, wherein sludge is collected in a lower end of the settling tank for subsequent removal, treatment and disposal, water overflowing from the settling tank being collected in a water storage reservoir and delivering water from the storage reservoir to be reused.

The invention is not limited to the embodiments described herein but can be amended or modified without departing from the scope of the present invention as defined by the appended claims, which invention is intended to be limited only by the scope of the appended claims as interpreted according to the principles of patent law including the doctrine of equivalents.

The invention claimed is:

1. A method of washing and grading sand comprises:
   passing sand entrained in water to a first fines separation stage comprising one or more hydrocyclones;
   passing sand in an underflow from the one or more hydrocyclones into a second fines separation stage comprising a tank having a plurality of spray bars arranged in a lower region of the tank, the spray bars coupled to a water supply such that an upwardly directed flow of water is created in the tank, the tank including a weir and a baffle plate;
   washing excess water and fine material out of the sand passing over the weir;
   passing the sand out of a sand outlet of the tank in or adjacent the lower region of the tank and onto a deck of a dewatering screen;
   grading and dewatering the sand on the dewatering screen;
   passing oversize material over a downstream end of the deck of the dewatering screen as a sand product, while undersize material and water passing through the deck are collected in a sump of the dewatering screen;
   receiving the underflow from the one or more hydrocyclones of the first fines separation stage into a first section of the tank;
   providing the sand outlet in a lower region of a second section of the tank;
   wherein the baffle plate extends transversely across a width of the tank between the first and second sections of the tank;
   passing the sand under a lower edge of the baffle plate which is spaced from a lower wall of the tank such that the sand passes between the first and second sections of the tank;
   delivering sand from the tank onto the deck of the dewatering screen though the sand outlet; and
   passing the water and the fine material over an upper edge of the baffle plate to pass from the first section to the second section of the tank.

2. The method of claim 1, wherein the excess water passing over the weir of the tank passes into the sump of the dewatering screen.

3. The method of claim 1, wherein the sand outlet is provided with an adjustable flow control device, said method comprising adjusting the adjustable flow control device to control the flow rate of sand and water onto the deck of the dewatering screen.

4. The method of claim 1, further comprising adjusting the water level in the tank by adjusting the height of the weir.

5. An apparatus for washing and grading sand, said apparatus comprising:
   a first fines separation stage including one or more hydrocyclones;
   a second fines separation stage, wherein an underflow from said one or more hydrocyclones passes to said second fines separation stage;
   said second fines separation stage comprising a tank having a plurality of spray bars arranged in a lower region of said tank, said spray bars configured to be coupled to a water supply and operable to create an upwardly directed flow of water within said tank;
   said tank including a weir over which excess water and any fine material washed out of the sand passes;
   a dewatering screen comprising a deck; and
   a sand outlet in or adjacent said lower region of said tank and adapted to pass sand onto said deck of said dewatering screen;
   wherein said dewatering screen the sand is graded and dewatered at said dewatering screen, and oversize material passes over a downstream end of said deck of said dewatering screen as a sand product while undersize material and water passes through said deck to be collected in a sump of said dewatering screen;
   wherein:
      a first section of said tank is configured to receive the underflow from said one or more hydrocyclones of said first fines separation stage;
      said sand outlet is provided in a second section of said tank;
      a baffle plate extends transversely across a width of said tank between said first and second sections of said tank;

a lower edge of said baffle plate is spaced from a lower wall of said tank such that sand passes under said baffle plate to pass between said first and second sections of said tank;

said sand outlet is provided in a lower region of said second section of said tank for delivering sand from said tank onto said deck of said dewatering screen; and the water and the fine material passes over an upper edge of said baffle plate to pass from said first section to said second section of said tank.

6. The apparatus of claim 5, wherein the excess water passing over said weir of said tank is passed into the sump of said dewatering screen.

7. The apparatus of claim 5, wherein said sand outlet is provided with an adjustable flow control device adapted to control the flow rate of sand and water onto said deck of said dewatering screen.

8. The apparatus of claim 5, wherein a height of said weir is adjustable to adjust the water level in said tank.

9. The apparatus of claim 5, wherein said baffle plate is spaced from and extends parallel to said weir.

10. The apparatus of claim 9, wherein an upper edge of said baffle plate is higher than an upper edge of said weir to facilitate the flow of sand beneath said baffle plate by creating a height differential in the level of water in said first and second sections of said tank.

11. The apparatus of claim 5, wherein said spray bars are adapted to direct the flow of water against said baffle plate to facilitate attrition of a feed material passed into said tank from said first fines separation stage.

12. An apparatus for washing and grading sand, said apparatus comprising:

a first fines separation stage including one or more hydrocyclones;

a second fines separation stage, wherein an underflow from said one or more hydrocyclones passes to said second fines separation stage;

said second fines separation stage comprising a tank having a plurality of spray bars arranged in a lower region of said tank, said spray bars configured to be coupled to a water supply and operable to create an upwardly directed flow of water within said tank;

said tank including a weir over which excess water and any fine material washed out of the sand passes;

a dewatering screen comprising a deck; and a sand outlet in or adjacent said lower region of said tank and adapted to pass sand onto said deck of said dewatering screen;

wherein:

said dewatering screen the sand is graded and dewatered at said dewatering screen, and oversize material passes over a downstream end of said deck of said dewatering screen as a sand product while undersize material and water passes through said deck to be collected in a sump of said dewatering screen;

a first section of said tank is configured to receive the underflow from said one or more hydrocyclones of said first fines separation stage;

said sand outlet is provided in a second section of said tank;

a baffle plate extends transversely across a width of said tank between said first and second sections of said tank;

a lower edge of said baffle plate is spaced from a lower wall of said tank such that sand passes under said baffle plate to pass between said first and second sections of said tank;

said sand outlet is provided in a lower region of said second section of said tank for delivering sand from said tank onto said deck of said dewatering screen said tank includes a third section;

said weir separates said third section of said tank from said second section of said tank; and a water outlet is provided in a lower section of said third section and configured so that water passing through said water outlet passes into the sump of said dewatering screen.

13. The apparatus of claim 12, wherein said water outlet feeds into a feed box located in an opening in said deck of said dewatering screen to allow water to pass through said deck and into the sump of said dewatering screen.

* * * * *